United States Patent [19]
Le Noane et al.

[11] Patent Number: 4,666,541
[45] Date of Patent: May 19, 1987

[54] PROCESS FOR COUPLING OPTICAL FIBER IN RECEPTION BLOCK AND COUPLER

[76] Inventors: Georges Le Noane, Kerougan Bras, 22700 Tregastel; Daniel Boscher, Résidence "Les Huniers", 22700 Perros-Guirec; René Lemarer, Kerougab Bras, 22700 Tregastel, all of France

[21] Appl. No.: 585,445

[22] Filed: Mar. 2, 1984

[30] Foreign Application Priority Data

Mar. 9, 1983 [FR] France ............... 83 03874

[51] Int. Cl.[4] .................. B65H 69/02; G02B 5/16
[52] U.S. Cl. ........................ 156/158; 156/159; 156/304.2; 350/96.15
[58] Field of Search ......... 156/158, 159, 304.2, 156/296, 166; 350/96.15, 96.21

[56] References Cited
U.S. PATENT DOCUMENTS 4,043,854  8/1977  Le Noane et al. ............ 156/158
4,564,262  1/1986  Shaw ........................... 350/96.15

OTHER PUBLICATIONS
Electronic Letters, vol #15, No. 23, Nov. 1979, pp. 737-738, "Teecouple for Single Mode Fiber".

*Primary Examiner*—Michael Ball
*Attorney, Agent, or Firm*—Larson and Taylor

[57] ABSTRACT

A process for making a fiber optic coupler. An optical fiber reception block of rigid material that has orthogonal longitudinal and transversal planes of symmetry, an arcuate fiber receiving groove extending along the longitudinal plane of symmetry, and a plurality of reference surfaces is provided. An optical fiber is glued into the groove and the block is cut along a plane perpendicular to the longitudinal and transversal planes of symmetry to remove part of the fiber. The block is then cut in half along the transversal plane of symmetry, the two halves are superimposed in inverted positions and aligned by using a reference surface. This process forms a multibranch coupler that finds numerous applications in telecommunication systems.

4 Claims, 12 Drawing Figures

PROCESS FOR COUPLING OPTICAL FIBER IN RECEPTION BLOCK AND COUPLER

The invention relates to optical fiber couplers suitable for use in optical fiber transmission systems.

There exist fields of use of fibers, for instance communication systems, which require couplers for fulfilling different functions, in particular for connecting systems with N branches to systems with N branches or P branches (N and P being integers). Couplers will be required by millions and they must be simple, reproducible, rugged, inexpensive and easy to use. They must be flexible in use, suitable for integration of optoelectronic components. It is desirable that they should be compact to facilitate their integration in an assembly.

Presently available couplers do not completely fulfill such requirements. Most couplers only allow coupling two branches to two branches or to a single one. A coupler between two single mode fibers is known (French No. 2 492 114) and requires that the two fibers be polished before they are placed in contact. The need of such polishing deprives the procedure of any industrial character. Moreover, reproducibility is difficult to ensure. Another type of coupler consists of two fiber optic reception blocks. Each block consists of a block of fused quartz or silicon in which fiber receiving slots are machined. After the fibers have been mounted and glued in the slots, the foces into which the slots open are lapped until part of the fiber cladding is removed, then polished. Matching of the two fibers requires progressive and time consuming adjustment which is not acceptable for large scale use.

It is an object of the invention to provide an improved block or piece suitable for use in a fiber optic coupler. It is a more particular object to provide a coupler whose essential building block is of relatively low cost, adapted to manufacture by industrial large scale process, flexible in use, and however enables accurate coupling without manipulating and careful adjustment during assembly.

Such objects are achieved with an optical fiber reception block of rigid material, having a longitudinal plane of symmetry and a transversal plane of symmetry orthogonal to each other, formed by molding with an arcuate convex typically V-shaped fiber receiving groove, which opens through a first curved face of said block and extends along said longitudinal plane of symmetry. The block has a first reference surface formed parallel to the longitudinal plane of symmetry and a reference surface perpendicular to the first plane of symmetry and to the transversal plane of symmetry orthogonal to the first one, situated in the immediate vicinity of the groove.

The second reference surface may be formed more especially by a surface of a notch on recess in the first face of the block, proximate a central zone of the groove, in which zone the optical fiber will be retained. A V-shaped profile of the groove insures accurate positioning of the fiber.

Two additional reference faces may be molded symmetrically to one another with respect to the transversal plane of symmetry and to the groove. One face of the block opposite that in which the groove is formed may also serve as angular reference for the piece. On the other hand, in most cases, its distance to the groove will not have to be defined with a high degree of accuracy.

That block is very flexible in use and is suitable for construction of a two branch coupler as well as of a two-to-one coupler.

In a first process for forming a coupling device, the reception piece is provided with a fiber, then cut into two halves which are then placed face to face, thus achieving matching since the two halves are obtained from a same block. The assembly thus formed has a front face with two perfectly referenced fiber sections; a centering device may be associated with the front face to receive directly the end piece of a connector of an optical line. Thus a two brach coupler is formed.

A four branch coupler may also be formed by confronting side by side two reception blocks each carrying an optical fiber section, after cutting out the top part of the blocks along a plane perpendicular to the two planes of symmetry of the block, so as to provide a good contact between the fibers. Finally, the blocks (or two half blocks joined together) may be positioned in a case of simple construction.

Whatever the embodiment, a component is formed having at least one optical output and having one or more electrical outputs when optoelectronical components are placed on the block (which may be provided with a centering device ensuring accurate positioning thereof). Such a component is easily integrated in a complete optical fiber transmission line and finds numerous applications, particularly in telecommunication systems, which may convey very different services, such as telematic, TV and visiophone. The invention is of particular inerest in the latter case, for it allows to separate the telematic function from the TV and visiophone function so as to obtain a modular and evolutive network.

The invention will be better understood from the following description of embodiments of the invention, given by way of examples.

SHORT DESCRIPTION OF THE DRAWINGS

DETAILED DESCRIPTION OF PARTICULAR EMBODIMENTS

Figure 1:
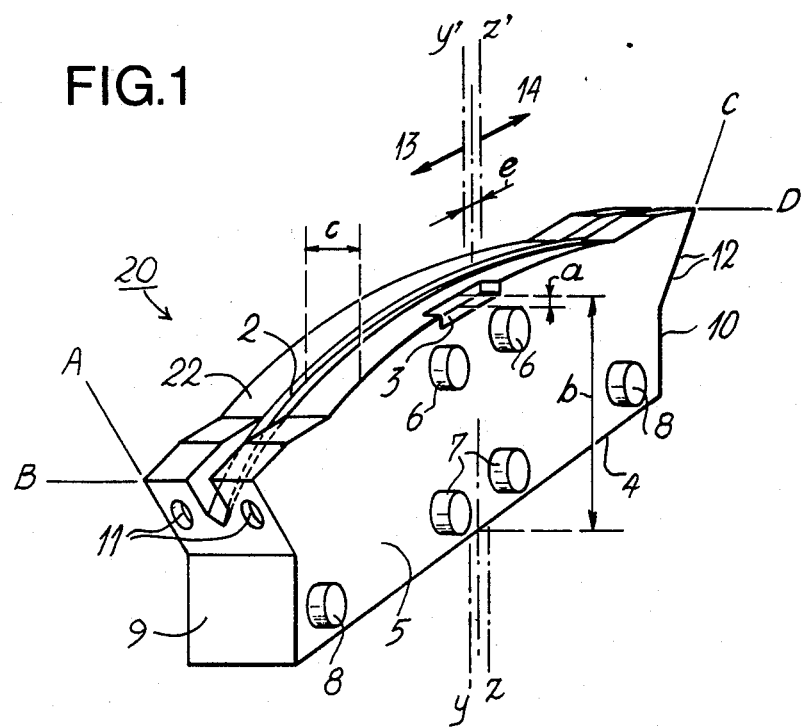
FIG. 1 is an isometric view of a molded optical fiber receiving block according to the invention.

Referring to FIG. 1, the block or piece 20 is manufactured by molding a low contraction resin, typically charged. Such resins are known (for example the one sold under the reference "ADAPTIC" by JOHNSON & JOHNSON) whose contraction does not exceed $0.2 \times 10^{-2}$ and the polymerization of which is rapid. The load may consist of quartz or silica having a grain size in the 10 μm range; the load content may be as high as 80%.

Figure 2:
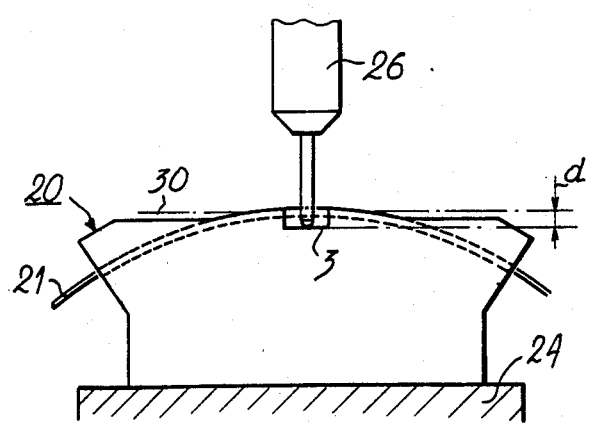
FIG. 2 is a schematic view showing longitudinal sawing of the fiber positioned in the block perpendicular to the two planes of symmetry of the block.
Figure 3:
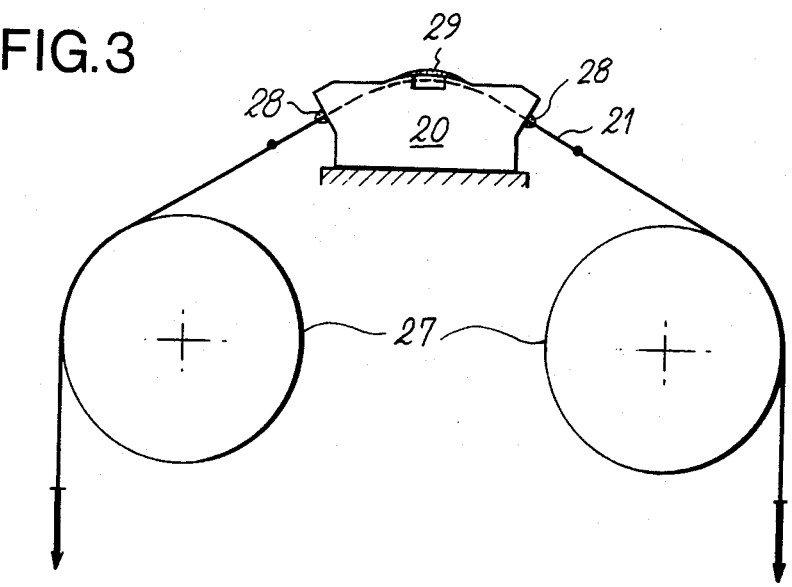
FIG. 3 is a schematic view of a device for positioning and bonding a fiber in the block.

Part 20 has a plane of longitudinal symmetry and a plane of transverse symmetry orthogonal to each other. A first face of the piece, symmetrical with respect to the two planes and which will be called hereafter "working face" 22, is intended to receive a fiber 21 to be coupled (FIGS. 2 and 3). In this working face 22 is provided a V-shaped groove 2. Groove 2, whose axis is in the median plane (plane of longitudinal symmetry) has, in the zone close to the plane of transverse symmetry, a radius of curvature chosen as a function of the characteristics of fiber 21 to be coupled (stepped index or graded index, core diameter, etc) and of the injection conditions in the case of integration of an optoelectronic component (laser diode or light emitting diode) so as to provide coupling and minimize the incidence of a reflection in the second branch of the coupler. The criteria for choosing this radius are known and so have not been given here. Finally, the quality of the V (dimension, surface condition, angle) is important for guaranteeing sawing with a maximum rate of success. For a fiber having an outer diameter of 125 micrometers, optimization leads to adopting a V having a height of 2000 micrometers and an angle of about 90°.

The position of groove 2 must be accurately defined with respect to several reference surfaces (or sets of surfaces) provided on pieces 20, so that the piece may be subsequently used in a coupling device.

A first reference surface 3, whose role is essential, is provided perpendicularly to the two planes of symmetry and proximate the central zone of the groove. This proximity and the use of a low contraction resin allows the piece and the fiber to be split into two halves by sawing with high precision. In practice, the position of fiber 21 with respect to the surface of the piece will be reproducible within a micron.

Figure 4A:
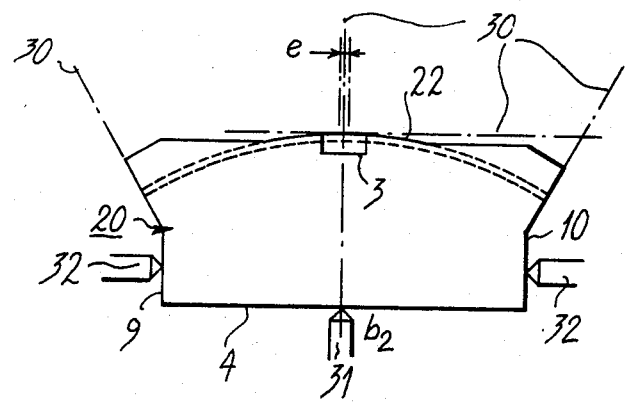
FIGS. 4a and 4b are side elevation and top views, showing the reference surfaces and the sawing location during construction of a coupler device using a block of the kind shown in FIG. 1.
Figure 4B:
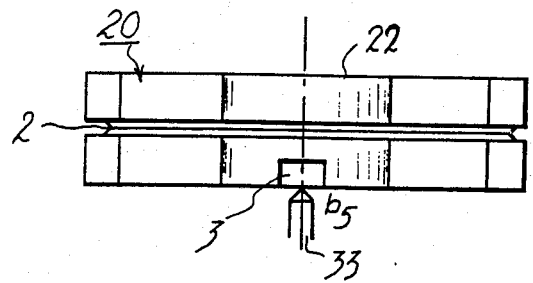

A second flat reference surface 4, opposite the working face 22, forms the bottom of the piece. It allows piece 20 to be given correct orientation in a sawing assembly comprising a base 24, as will be seen further on (FIGS. 2 to 4). It must be parallel to surface 3 but the spacing B therebetween does not need to be maintained with high accuracy.

A flat lateral surface 5, which may be reduced to three support studs 6, 7 and 8 on each half piece, must be parallel to the longitudinal plane of symmetry and situated at a distance C from this latter. The distance C is readily obtained with good accuracy by molding, because of the low value of C compared with B. It will be seen that this accuracy is required for forming a device for coupling two branches to two, which involves coupling together two pieces 20 placed facing each other. In the case of a two branch device, using the two halves of a piece sectioned in the transverse plane of symmetry, the inherent flatness of surface 5 is on the contrary sufficient to ensure satisfactory positioning.

Finally, two flat surfaces 9 and 10 of the piece, symmetrical and perpendicular to surfaces 4 and 5, define the transverse plane of symmetry in which piece 20 must be sawn so as to form a two branch coupling device. They may be completed by oblique surface portions having cavities 11 and 12 obtained during molding and intended to serve as positioning reference for optoelectronic components. Because of the small distance between the V shaped groove 2 and the cavities, their relative position is reproducible with accuracy. The two surfaces 9 and 10, perpendicular to surfaces 5 and 4, are used in the sawing assembly for carrying out sawing centered in the middle of the piece. This sawing, shown by axes yy' and zz' is effected by removing a minimum amount of material corresponding to the thickness of an abrasive disk, whose thickness e may be 0.2 mm. An accuracy to a few hundredths of a millimeter in the location of the cut is sufficient: it corresponds then to traditional molding and machining techniques.

It will be seen that cavities 11 and 12, the formation of which by molding ensures a position defined with respect to the V shaped groove 2 and so with respect to the fiber, serve as reference for inserting, with sufficient accuracy for obtaining correct coupling, optoelectronic components such, for example, as a light emitting diode and a photodiode. The surfaces used in such components do not require unduly high accuracy for obtaining sufficient coupling for low digital flow transmission applications. Precisions of the order of a few microns, even of a few hundredths of a millimeter, are sufficient. In the industrial stage of manufacture of such components, it is relatively easy to center the active part of the component with respect to the reference device which will be fitted into the receiving cavity of the device of the invention.

Cavities 11 and 12 may also be used, during sawing, for preparing the endmost faces of the fibers in a plane perpendicular to the axis thereof (plane AB and plane CD in FIG. 1).

The operations to be carried out on piece 20 for implementing the invention will be different depending on the type of coupling to be provided. In the most complex case, these operations will comprise:
  removal of material in piece 20 and the fiber previously bonded thereon, as far as a longitudinal plane, to a level predetermined with respect to the reference surface 3,
  sawing of the endmost faces of the fiber sections,
  sawing of the molded piece 20 so as to form two half pieces therefrom.

The abrasion operation is shown schematically in FIG. 2. Abrasion to a precise dimension d is effected without difficulty by means of a high speed rotary disk. A feeler 26 bearing on the reference surface 3 and integral with the frame supporting the disk ensures the required accuracy. The surface condition obtained is close to that of polishing. So as to obtain characteristics completely equivalent to those of a mechanically polished base, a liquid, having an index greater than that of the material forming the fiber (silica in general), will be introduced between the contacting fiber portions. The matching liquid may be a grease, an adhesive or a silicone oil.

Sawing of fiber 21 so as to form two sections having acceptable end faces may be effected in an assembly of the kind shown in FIG. 3. Fiber 21 is first of all urged to the bottom of the V shaped groove 2 by means of a system applying a tension of a few tens of grams. In the embodiment illustrated, this system comprises two guide pulleys 27 for traction wires.

It should be noted in passing that fiber 21 may be either unsheathed or covered with a coating a few microns thick, to the extent that this coating is fully concentric with the fiber. Now, it is perfectly well known how to form coated fibers under such conditions in lengths limited to a few hundred meters, which is sufficient for forming a large number of couplers. In plain language, it is possible to work from sheathed fibers, which represents a great advantage in automated industrial manufacture, since the fiber is not made fragile by being unsheathed and may have a guaranteed life span.

Bonding of fiber 21 in the V shaped groove 2 will be advantageously provided by means of the same resin as the resin used for manufacturing piece 20, which gives a close connection between the materials. This resin, of great hardness and low contraction, may preferably be the same as that of the piece, but without a silica load. For sufficient industrial yield, a resin will be adopted polymerizing in a short space of time, typically 1 to 4 minutes. Naturally, several assemblies of the kind shown in FIG. 3 may be placed in parallel so as to increase the efficiency. Filling with adhesive must be sufficient to reach the ends of the V shaped groove, as shown at 28 in FIG. 3, and so as to overflow from the groove into the central part, as shown at 29.

Sawing of the piece and of the fiber may be carried out in an automatic machine, for instance as described in French Pat. No. 81 23721, comprising jigs for receiving the piece. The sawing or abrasion planes 30 may be perfectly well defined in the assembly by means of feelers or stops schematized at 31, 32 and 33 in FIGS. 4A and 4B, in addition to feeler 26 already shown in FIG. 2.

Figure 5B:
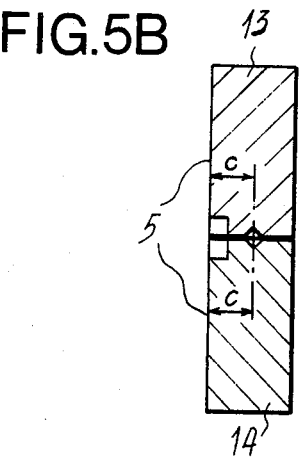
FIGS. 5a and 5b are diagrammatic elevational and end views, showing a coupler device obtained after the block has been sectioned into two halves and the two halves have been placed facing each other.
Figure 5A:
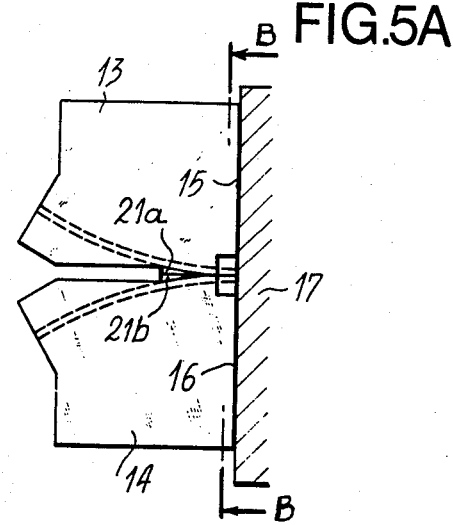

Once the sawing has been effected, a two branch coupler may be formed by placing two half pieces 13 and 14 face to face as shown in FIGS. 5A and 5B. Because the two half pieces have been obtained by transverse sawing of the same piece and because the coupling is effected by turning over the two half pieces along their reference plane, the two fiber sections 21a and 21b are automatically placed facing each other: dimension C is guaranteed by a simple parallelism of the V shaped groove and of the reference surface. The longitudinal adjustment, whose influence on the efficiency of the coupler is limited, is simply formed by placing the two sawn faces 15 and 16 in abutment against the same plane 17 (FIGS. 5A).

Figure 6:
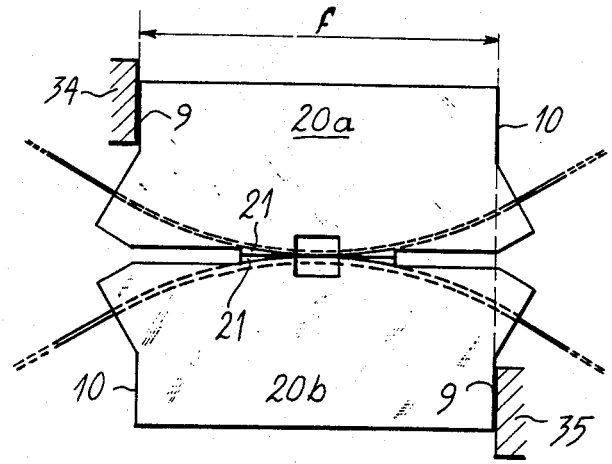
FIG. 6 is a schematic elevation view showing a device for coupling two fibers, obtained by placing two blocks facing each other which have only been sawn longitudinally in the way shown in FIG. 2.

When it is desired to form a coupler with two branches to two, it is not necessary to section piece 20 into two half pieces. Then to complete pieces 20a and 20b are coupled together as shown in FIG. 6. The coupler is formed by placing the reference faces 9 of the two pieces 20a and 20b in abutment against abutment surfaces 34 and 35 whose distance L is equal to the theoretical length of each of pieces 20a and 20b, except for a manufacturing tolerance. The construction of satisfactory couplers obviously entails good accuracy and good reproducibility of dimension f.

Figure 7A:
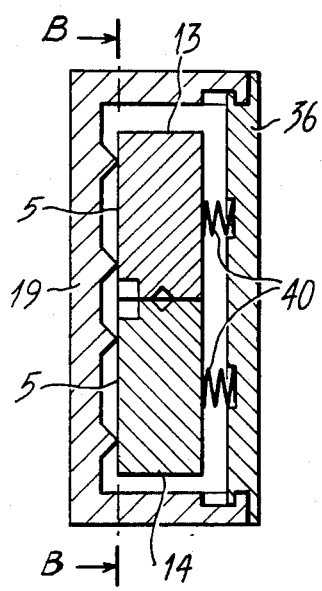
FIGS. 7a and 7b are sectional views along lines A—A and B—B respectively, of a coupler comprising a case and two facing half blocks.
Figure 7B:
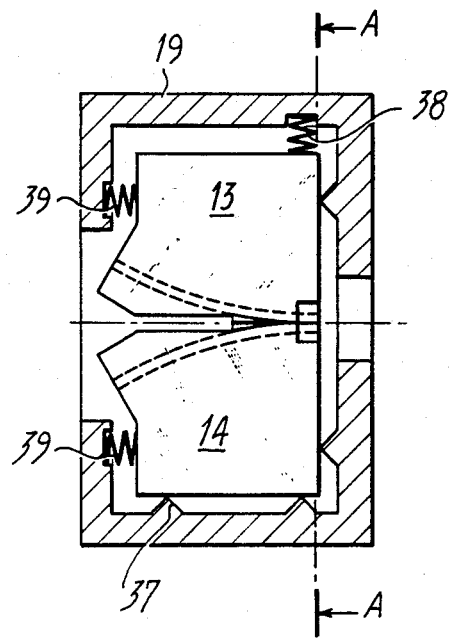

The optical coupler thus formed will have to be placed in a case. FIGS. 7A and 7B show a possible case construction intended for a two branch coupler. This case comprises a body 19 and a lid 36. The case must apply the two sawn faces of the fiber sections one against the other. In the case illustrated in FIG. 7B, this pressure is provided by placing the half piece 14 to bear on reference studs 37 and by inserting a resilient element 38, shown schematically by a spring in FIGS. 7B, between the half piece 13 and the body of the case. A rigid pressure element could also be provided in numerous cases. A similar device should be provided for pressing the two half pieces 13 and 14 against a face of the case for longitudinal positioning: in FIG. 7B, the device is similar to the preceding one. It comprises bearing studs for half pieces 13 and 14 and resilient elements 39, shown schematically by springs. Finally, the half pieces are applied against the bottom of body 19, provided with studs defining a reference surface, by means of a resilient device inserted between these half pieces and the lid 36, shown schematically in FIG. 7A by springs 40.

Thus, lateral positioning of the two sawn faces of the fibers to be coupled is achieved. These devices and the case may be of simple construction, resilient elements being springs and the case being made from molded plastic material.

Figure 8:
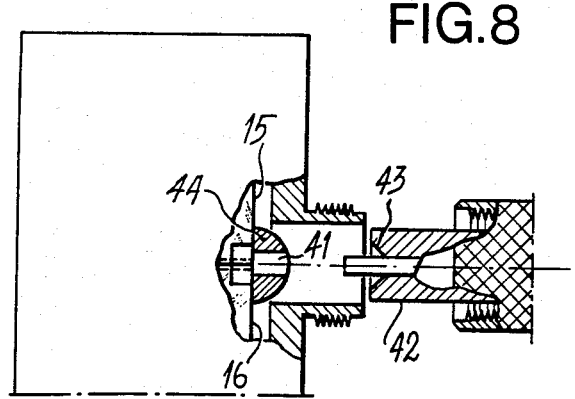
FIGS. 8 and 9 are diagrams showing couplers in a case.

An optical line connecting device may be integrated with the coupler shown in FIG. 7, which avoids having to effect in sequence the formation of an output branch, then the connection, and so improves the gain by doing away with a connection point and reduces the cost. In the case illustrated in FIG. 8, the device for coupling the optical line comprises a half sphere 44 pierced with a hole 41 for receiving a connector end piece 42, which half sphere ensures centering of the connector end piece through the sphere coming to bear on cone 43. The coupling may be provided in a simple way, for example by bayonet or screw coupling. The half sphere 44 is integrated, for example by bonding it to the front face of the device, formed by the sawing faces 15 and 16 (FIG. 8). Fixing may be performed on an assembly allowing automatic operation, the output of the coupler (FIG. 7) being illuminated while the sphere is adjusted so that its center does not deviate more than a few microns from the center of the surface of the coupler. Thus the coupling may be optimized if so desired and efficiency of coupling in one or other branch of the coupler may be varied at will by simply shifting the position of the half sphere. Positioning may be simply effected by means of known devices, such as a microscope or self collimating lens.

Integration of the coupling device may be effected by means of very varied devices, and not only by means of the one shown in FIG. 8. In fact, the coupler of the invention may be adapted to all conventionally adopted connectors, on condition that a reference device capable of receiving the end piece of the connector is inserted and that a centering system is provided allowing adjustment of the performance of the coupler.

Figure 9:
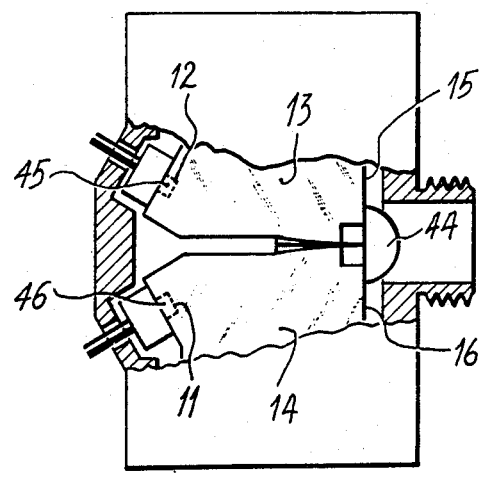

In the variant shown in FIG. 9, the case is adapted to receive two optoelectronic elecments 45 and 46 whose precise positioning is made possible because of the presence of the centering elements 11 and 12. Thus a product is obtained having an optical output and two electric outputs, which may be readily integrated in a complete optical fiber transmission line.

Thus economic couplers may be provided for substantially general purpose use, and requiring little space since the thickness will typically vary between two and ten millimeters. The usual radii of curvature of the groove, between 30 and 120 mm for 50/125 micron fiber, may also be readily formed with the required accuracy. Since shaping is achieved by sawing, it is much more economical than lapping and polishing and does not result in the distortions due to the polishing pressure.

We claim:

1. A process for making a fiber optic coupler comprising the steps of:
   providing an optical fiber reception block of rigid material having a longitudinal plane of symmetry and a transversal plane of symmetry orthogonal to each other, formed by molding with an arcuate fiber receiving groove which opens through a first face of said block and extends along said longitudinal plane of symmetry, a first flat reference surface parallel to said longitudinal plane of symmetry and at a predetermined distance from said groove and a second reference surface perpendicular to said first and second planes of symmetry and at a distance from said groove substantially smaller than the size of said block as measured along the intersection of said first and second planes of symmetry; securely gluing an optical fiber in the groove of said block; sawing said block and fiber along a plane perpendicular to said planes of symmetry at a depth selected with respect to said second reference surface to remove part of said fiber in a central zone of said block, sawing said block and fiber in two halves along said second plane of symmetry; and superposing the two halves in inverted positions with the two halves of the optic fiber confronting and contacting each other, alignment of the two halves being provided by using the first reference surface and the saw cut.

2. A process according to claim 1 wherein said block halves are positioned through said reference surfaces faces against abutment means in a containment casing and opto electronic components are fixed to said casing for coupling with the fiber halves.

3. A process for manufacturing a fiber optic coupler, comprising the steps of:
(a) providing a pair of identical blocks of rigid material each having a longitudinal plane of symmetry and a transversal plane of symmetry orthogonal to each other, formed by molding with an arcuate fiber receiving groove which opens through a first face of said block and extends along said longitudinal plane of symmetry, a first flat reference surface parallel to said longitudinal plane of symmetry and at a predetermined distance from said groove and a second reference surface perpendicular to said first and second planes of symmetry and at a distance from said groove substantially smaller than the size of said block as measured along the intersection of said first and second planes of symmetry, said blocks further having a pair of third symmetrical reference surfaces symmetrical to one another with respect to said plane of symmetry, into which said groove opens;
(b) securely gluing an optical fiber in the groove of the first one of said pair of blocks and sawing said first block and fiber along a plane perpendicular to said planes of symmetry at a depth selected with respect to said second reference surface to remove part of said fiber and said block in a central zone of said block;
(c) repeating step (b) in the second one of said pair of blocks and
(d) superposing the first and second blocks in inverted positions with the optical fibers in contact, proper relative positioning of the first and second blocks being achieved using the first and third reference surfaces.

4. A process according to claim 3, wherein each said fiber is bonded in the groove of the associated block which is of silica loaded resin with an amount of the same resin without load before sawing is performed.

* * * * *